United States Patent [19]

Moore et al.

[11] E Re. 31,297

[45] Reissued Jul. 5, 1983

[54] FULL COVERAGE RECIRCULATING SPRAYER

[75] Inventors: John O. Moore, West Helena; Ray H. Dawson, Lexa, both of Ark.

[73] Assignee: Sprayrite Manufacturing Co., West Helena, Ark.

[21] Appl. No.: 165,132

[22] Filed: Jul. 1, 1980

Related U.S. Patent Documents

Reissue of:

[64] Patent No.: 4,168,798
Issued: Sep. 25, 1979
Appl. No.: 874,396
Filed: Feb. 2, 1978

[51] Int. Cl.[3] ..... B05B 1/28

[52] U.S. Cl. ..... 239/121; 239/148; 239/175; 47/1.7

[58] Field of Search ..... 239/120, 121, 124, 148, 239/145, 146, 159, 170, 172, 175; 4.7/1.5, 1.7; 111/1; 261/106, 98

[56] References Cited

U.S. PATENT DOCUMENTS

| | | | |
|---|---|---|---|
| 668,950 | 2/1901 | Brakeley | 47/1.7 |
| 1,416,065 | 5/1922 | Rhodes | 239/124 X |
| 1,454,824 | 5/1923 | Stubfors | 47/1.7 |
| 1,539,789 | 5/1925 | Walker, Jr. | 47/1.5 |
| 1,564,572 | 12/1925 | Hester | 47/1.7 |
| 1,764,952 | 6/1930 | Hay | 47/1.7 X |
| 2,029,166 | 1/1936 | Hales | 47/1.7 X |
| 2,311,782 | 2/1943 | Segars | 47/1.5 |
| 2,566,366 | 9/1951 | Pennington | 261/106 X |
| 2,977,715 | 4/1961 | Lindsay | 239/655 X |
| 3,584,787 | 6/1971 | Thomason | 239/121 |
| 3,728,817 | 4/1973 | Huey et al. | 47/1.5 X |
| 4,019,278 | 4/1977 | McKirdy | 47/1.5 |
| 4,139,155 | 2/1979 | Field et al. | 239/121 |
| 4,147,305 | 4/1979 | Hunt | 239/167 |

FOREIGN PATENT DOCUMENTS 32671 10/1964 German Democratic Rep. ... 47/1.5

OTHER PUBLICATIONS

Rutz, Glen, "Recycling Sprayer . . . ", *Southwest Farm Press*, Aug. 14, 1975.

"The Recovery Sprayer-A New Concept In Post-Emergent Weed Control", A Riverside Chemical Company Sales Brochure, Memphis, TN.

"Recircu-Sprayer", A Toll Agr-Spray Sales Brochure, Little Rock, Arkansas.

Obernathy, John R., "Recirculating Sprayers Prove Worth", *Southwest Farm Press*, Feb. 17, 1977.

"Recirculating Sprayer-Meet the Inventor", p. 42, *Farm Industry News*, Jan. 1979.

*Primary Examiner*—Andres Kashnikow

*Attorney, Agent, or Firm*—Hill, Van Santen, Steadman, Chiara & Simpson

[57] ABSTRACT

A recirculating sprayer adapted for mounting on a vehicle is improved for use at increased travel speed and for operation in higher wind conditions by angling the solid spray streams forwardly or rearwardly from a direction transverse to the travel direction. The sprays are employed in criss-cross, opposite pairs, with the spray stream patterns of adjacent pairs of spray nozzles abutting or overlapping one another for full coverage of all upstanding weeds or crops in an area traversed by the sprayer. A series of collector mats or panels may be arranged transverse to the travel direction, with sprays trained thereon for contacting each weed twice in its upstanding position once by each spray of a pair; the weeds may also be contacted once more as they are bent forward to pass beneath the panels and a reservoir thereunder. The collector may also be arranged in panels parallel to the travel direction, for increased ease in negotiating sloping terrain. Spray liquid is collected from the collector panel(s) into reservoirs therebelow and is recirculated for reuse.

31 Claims, 11 Drawing Figures

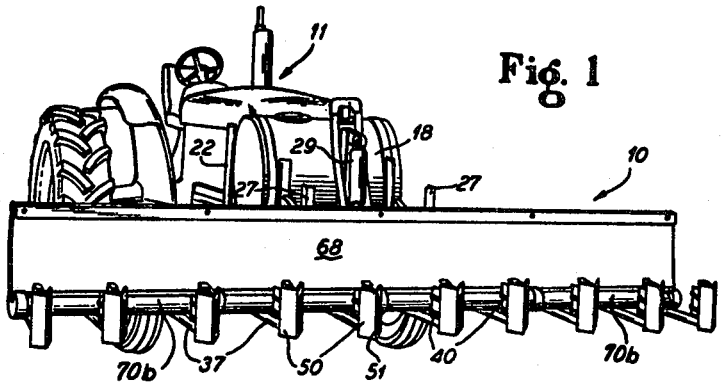
Fig. 1
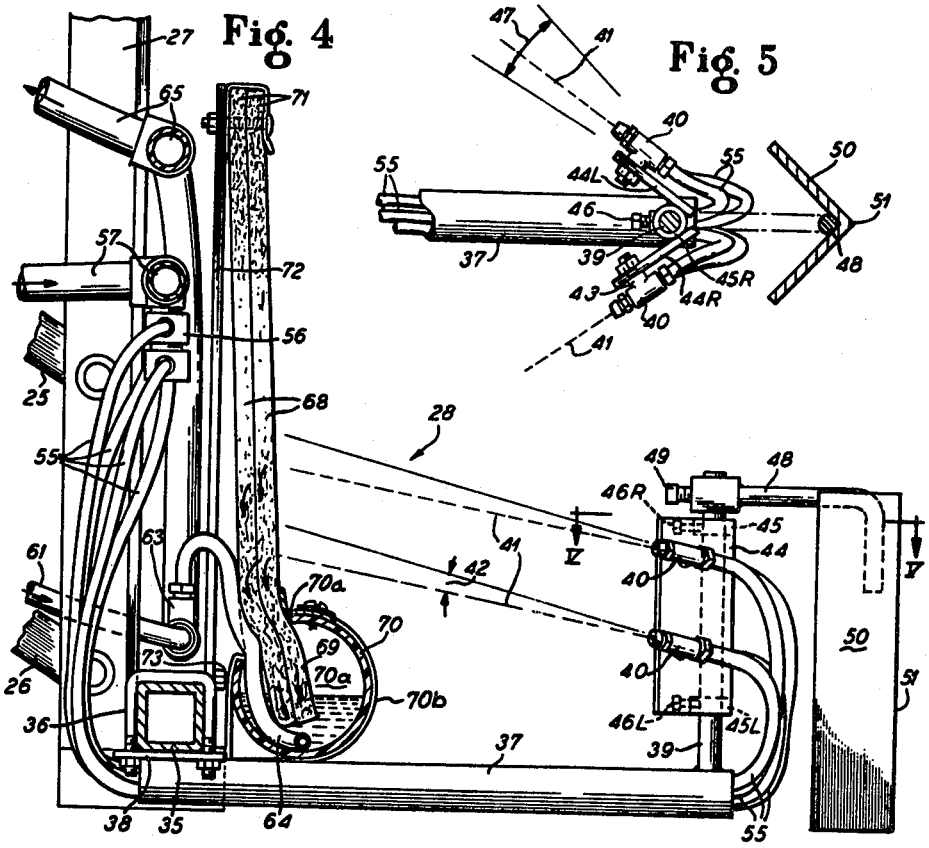
Fig. 4
Fig. 5

FULL COVERAGE RECIRCULATING SPRAYER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to herbicide and/or insecticide application devices for farm crops and pastures, the devices reclaiming and reusing spray material which has not contacted target weeds or other plant material.

2. The Prior Art

Prior methods of herbicide application have lost 100% of all chemical material exiting a spray nozzle orifice, onto target plants, crops, and the soil. All herbicide material not actually contacting the target weed plants constitutes an economic loss, decreases weed control efficiency, and also increases concentration of herbicides in the soil and on the useful crop plants.

Recirculating sprayers have been developed within the last several years by the Delta branch Experiment Station at Stoneville, Mississippi. The device, commercialized in several forms, is substantially limited to application with row-planted crops only. Solid streams sprayed substantially transversely to the direction of sprayer travel are directed into fairly wide collector boxes. Areas beneath the collector boxes and between the spray nozzles are not traversed by any herbicide sprays, leaving ribbons of untreated weeds. Also, such prior art devices are limited in their travel speed capabilities and their operating characteristics in higher winds.

SUMMARY OF THE INVENTION

An improved recirculating sprayer wherein solid spray streams are angled rearwardly or forwardly in opposed pairs with respect to a direction transverse to the travel direction of the vehicle carrying the sprayer. The opposed streams form criss-cross patterns for double-contact coverage of weeds standing above the crop. Adjacent stream patterns abut or overlap one another for substantially 100% contact with all weeds traversed by the sprayer. Fibrous collector panels for capturing and recirculating unused spray may be arranged either transversely to or parallel to the travel direction.

THE DRAWINGS

FIG. 1 is a front side view in perspective of a farm tractor with the spray assembly of the present invention mounted on the front thereof.

FIG. 4 is a detail, side-sectional view taken on line IV—IV of FIG. 2.

FIG. 5 is a top plan view, partly in section, taken on line V—V of FIG. 4.

THE PREFERRED EMBODIMENTS

Figure 2:
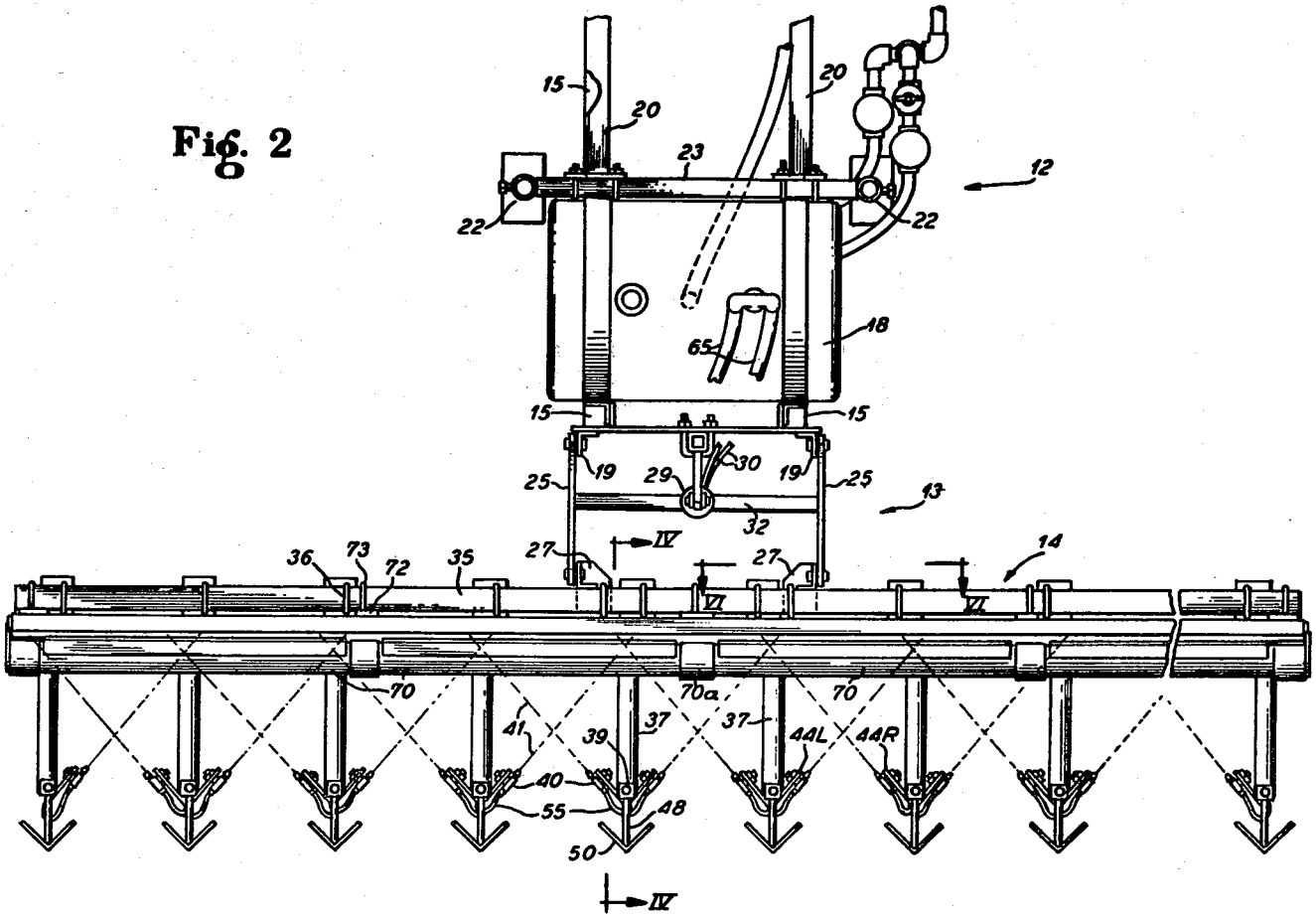
FIG. 2 is a top plan view of the sprayer assembly of the present invention, in operation.
Figures 3, 6:
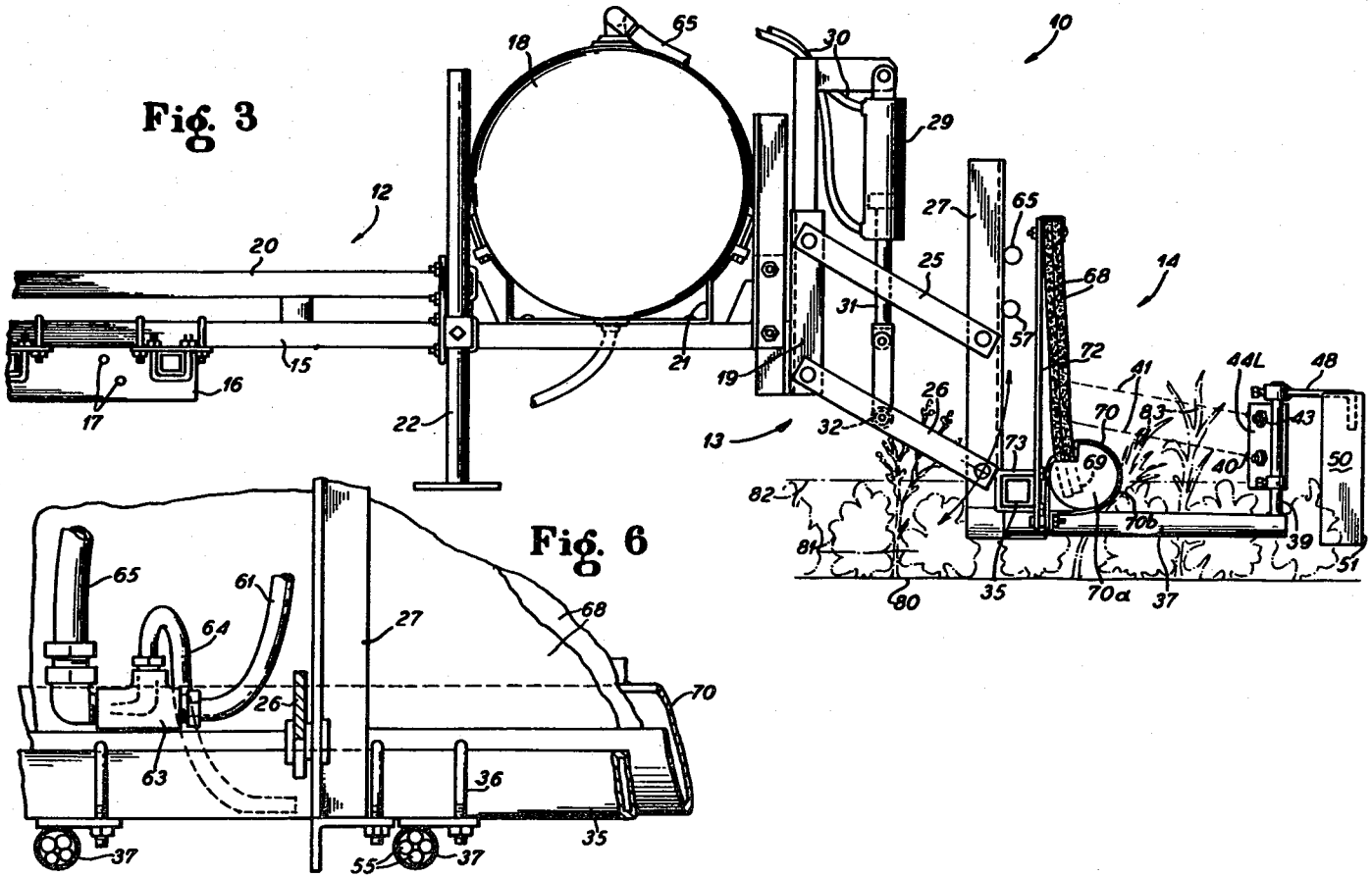
FIG. 3 is a side elevational view of the apparatus of the invention.
FIG. 6 is a rear elevational view, partly in section, taken on line VI—VI of FIG. 2.

A sprayer assembly 10 is carried for traversal of an agricultural area by a tractor 11 or other vehicle, as in FIG. 1. The sprayer assembly 10 comprises a support framework 12, a height adjustment mechanism 13, and an application and collector section 14. As shown in FIGS. 2 and 3, the support framework 12 comprises longitudinal struts 15 which are carried by a bracket 16 connected as by means of bolts 17 to the main frame of the tractor 11. The longitudinal struts 15 extend forwardly of the tractor 11 and support there a herbicide tank 18 and a rearward, vertical member 19 of the height adjustment mechanism [14] *13*. Upper stringers 20 are connected to the rear part of the longitudinal struts 15 as shown to support same against excess bending stresses. A bracket 21 attached to the forward part of each of the struts 15 supports the tank 18. A pair of vertically adjustable feet 22 are positioned at either end of a cross member 23 affixed to the struts 15 for selective ground support for storage of the sprayer assembly 10 between uses.

The height adjustment mechanism 13 comprises a pair of parallel links 25, 26 on either side of a center line of the assembly. The links 25, 26 together with the fixed rearward vertical members 19, 19 and forward members 27, 27 provide for parallel lifting of the spray applicator and collector section 14 with respect to the tractor 11 and frame support 15. An hydraulic cylinder 29 is remotely controllable from the tractor seat via fluid lines 30. An actuating rod 31 of the hydraulic cylinder 29 engages and actuates the lower parallel lines 26 by a horizontal link 32.

The spray applicator and collector section 14 in a first embodiment of the invention is constructed about a horizontal bar 35 connected to the front uprights 27 of the height adjustment mechanism 13. The bar 35 is thus carried transversely to the direction of travel of the tractor 11 and establishes a firm support for the spray mechanism 14 across its entire operating width. Such width may be greater for applications where fields are relatively flat, but must be smaller where fields are more uneven.

Attached by means of U-bolts 36 to the horizontal bar 35 are a plurality of projecting spray booms 37, each attached to a plate 38 receiving the U-bolt 36 therethrough. Each spray boom 37 is thus adjustable laterally along the horizontal bar 35 to effect any selected spacing between them. Carried on a front end of each bar 37 is an upstanding pin 39 connected irrotatably thereto. Each pin 39 carries a plurality of spray nozzles 40. Each nozzle 40 creates a solid stream of liquid 41, rather than a cone or mist of spray, to avoid loss of liquid which would drift onto the top and the soil.

Each nozzle 40 is adjustable as at 42 in FIG. 4 in a vertical plane from about 10° above the horizontal to about 30°, by means of an adjustable coupling 42 between each nozzle 40 and a nozzle carrier plate 44 connected to the upstanding pin 39. Adjustment of the rotational position of the plate 44 is effected by means of a collar 45 thereon engaging about the pin 39 and having a set screw 46. Left and right side nozzle plates 44L and 44R have collars at opposite vertical ends thereof to avoid interfering with one another. In accordance with the invention, adjustment of the spray 41 rearwardly or forwardly from the direction transverse to the direction of travel is accomplished through the arc 47, in FIG. 5; angles between about 15° and 45° from scuh transverse direction have been found most effective. At the top of the pin 39 a shield boom 48 is carried and is secured by means of a further set screw 49. The shield boom 48 carries at its forward end an angled shield 50 having a sharp leading edge 51 for diverting tall weeds to either side of the spray boom 37 and the components carried thereon.

Figure 7:
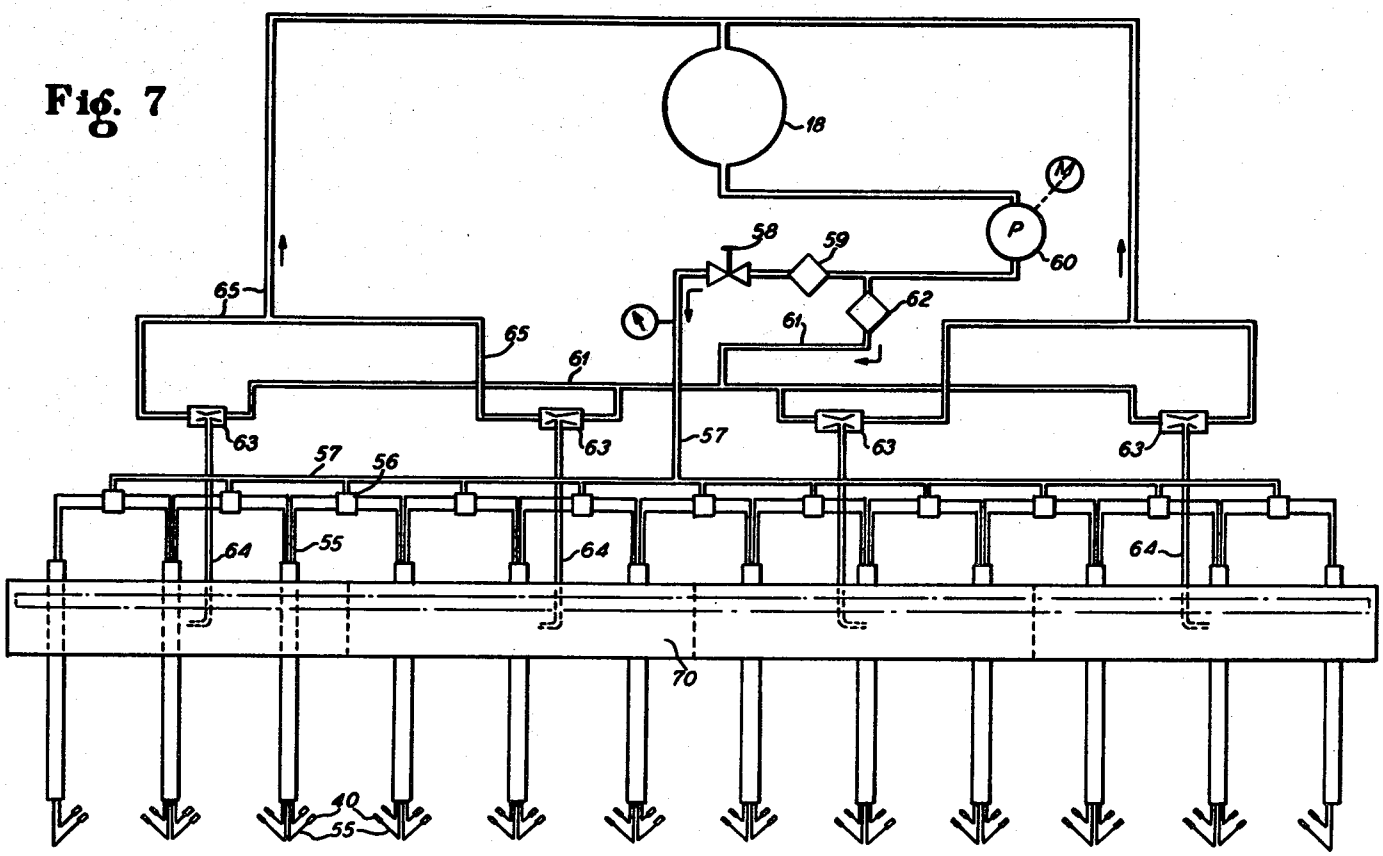
FIG. 7 is a schematic diagram of the plumbing and control systems for the sprayer assembly.

The spray nozzles 40 are supplied with pressurized herbicide or other spray fluid by means of plastic tubes 55 passing through the spray boom 37 and connecting to a distributor head 56. The head 56 is supplied with pressurized fluid from a large diameter line 57 extending forwardly to and along the horizontal bar 35. As developed in the schematic diagram of FIG. 7, the line 57 is supplied with fluid from the tank 18 through a throttling valve 58 and a filter 59 by a pump 60 driven by the tractor 11 in a conventional manner not shown. A second distributor line 61 is supplied by the pump 60 through a filter 62. The line 61 supplies a plurality of venturi suction heads 63 which communicate via lines 64 to the bottoms of collector reservoirs 70, as described below. The venturi heads 63 reduce pressure in the lines 64, drawing collected liquid from the reservoirs 70 and into output lines 65 connecting together and leading back to the tank 18. Because of the presence of the throttling valve 58 only in the spray line 57, the venturi heads 63 get full flow at all times, while the pressure and volume of flow to the spray nozzles 40 is under control of the operator of the tractor 11.

In further accordance with the principles of the present invention, the solid spray streams 41 are directed by the nozzles 40 to impact upon a collector mat 68 arranged generally vertically to form an absorptive collector surface and, in this embodiment, transverse to the direction of movement of the tractor 11. As shown in FIG. 2, each spray 41 [should intersect or overlap] *preferably intersects or overlaps* at least two other sprays before striking the mat 68, to assure full coverage of the field being traversed. Such is readily accomplished by selection of the boom 37 spacing and the rearward spray angle of the nozzles. The collector 68 preferably comprises one or two thicknesses of matted, fibrous material in which liquid gravitates by capillarity flow. The liquid of the streams 41 impacting upon the material trickles down gravitationally and by capillarity flow through the fibrous material to a lower edge 69 of the mats 68 enclosed within the reservoir 70. Walls of the reservoir 70 closely abut the mat(s) 68 to limit admission of foreign particles thereinto. The mat of fibrous material 68 also fulfills a secondary function since it tends to operate as a filter, thereby separating contaminants and impurities so that the liquid to be recirculated is relatively clean. The reservoir 70 is segmented along its lateral length as at 70A, so that side-to-side changes in elevation or attitude of the tractor 11 do not cause all the collected liquid to pass to the lower end of the entire assembly. Upper ends 71 of the mats 68 are attached together and supported by spaced vertical bars 72 connected to the horizontal bar 35, where they are adjustably retained as by further U-bolts 73. The mats 68, being substantially continuous across the entire width of the spray assembly 14 and extending relatively far above the horizontal bar 35, shield the sprays 41 somewhat from wind.

The reservoir 70 is shown sectioned for plastic material and may conveniently comprise a generally tubular member of polyvinyl chloride (PVC) or some similar chemically resistant material, and which is slotted as at 70a to admit the fibrous mat 68. It will be understood that the reservoir 70 could be made of metal, for example, stainless steel. The tubular configuration provides a surface rounded about a vertical axis, thereby forming an abutment surface 70b which will impact against vegetation and bend it over towards the spray nozzles 40 into the spray pattern 41. The reservoir also prevents the vegetation from directly engaging the mat 68 of fibrous material.

In operation, the tractor 11 with the sprayer assembly 10 mounted thereon is driven through an agricultural area 80 as in FIG. 3 having desired crops 81 growing thereon to a height 82. Noxious weeds 83 extending above such crop height 82 may be destroyed by spraying thereon a herbicidal chemical from the tank 18. The height of the spray section 14 is adjusted by the hydraulic actuator 29 and the parallel links 25, 26, to a selected height in relation to the crop height 82. The pump 60 is actuated, sending fluid coursing through the lines 57 and 61. Throttling valve 58 supplies about 10 psi pressure to the distributor heads 56 and the supply lines 55 going to the spray nozzles 40. Solid streams 41 ejected from the nozzles 40 contact upper parts of each weed 83 from both left and right sides, due to the criss-cross pattern of spray of the present invention. As shown in FIG. 2, the spray streams 41 cover with double sprays the entire area traversed by the sprayer assembly 10, insuring that even those weeds which are aligned with one of the spray booms 37 will receive direct spray from at least one of the nozzles as it is bent to one side or other by the shield 50 and then forwardly by the reservoir tube 70 and bar 35.

Spray streams 41 not contacting a weed 83 will pass unobstructed to the collector mat 68 and will be collected with minimal splashing and trickle therein to the lower edge 69 thereof for collecting in the reservoir 70. The herbicide collected from the reservoir 70 is passed through the suction tube 64 to the venturi 63 and back to tank 18 from the line 65. Thus, when the paths of the streams 41 of the spray assembly 10 are unobstructed, there will be substantially no loss of fluid from the system.

In the embodiment shown, the spray streams 41 are directed rearwardly, opposite to the direction of movement of the tractor 11. When the reservoir abutment surface 70b bends vegetation over, the spray nozzles 40 being arranged to project liquid streams above the level of the reservoir 70 will spray directly into the bent over vegetation. This is highly desirable, for example, in treating corn. Moreover, in a weeding process the rounded abutment surface 70b will not cut or break the vegetation and thereby interfere with the action of a systematic chemical. An important advantage is created by the rearward component of velocity of the spray stream 41, since the net impact speed of the stream upon the weed material 83 will be somewhat reduced. Thus, the spray assembly of the present invention is able to traverse the ground at speeds substantially double that of known prior art recirculating spray devices. Also, the large collector mats 68 serve to screen the sprays 41 somewhat from wind, enabling the device of the present invention to operate in wind conditions up to three times that of the known prior art. Because the sprayer apparatus 10 is suspended well in front of the tractor 11, dust kicked up by the wheels of the tractor cannot generally get into the herbicide system. Further, the fibrous matted material of the collector mats 68 filter any such dust and prevent most of it from passing through the mat to the lower end 69 thereof and into the reservoir 70.

Figure 8:
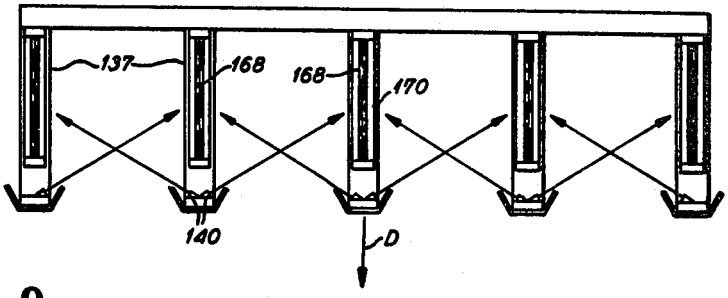
FIGS. 8 through 11 are top plan views, partly schematic, of sprayer assemblies employing collector panels arranged parallel to the direction of travel, and with various spray patterns and collector features.

Other embodiments of the structure of the present invention are shown in FIGS. 8 through 11. In FIG. 8, collector mats 168 are arranged parallel to the direction D of travel. Spray nozzles 140 mounted on each spray boom 137 each create one or more solid sprays of liquid herbicide directed toward adjacent collection mats 168. The sprays of each pair of nozzles between each pair of mats contact each other at or through the collector mats on which they are directed. Reservoirs 170 at the bottoms of the mats 168 collect the fluid as before for siphoning back to the tank.

Figure 9:
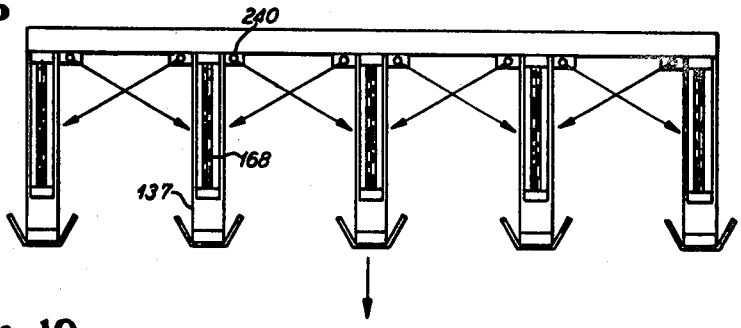
Figure 10:
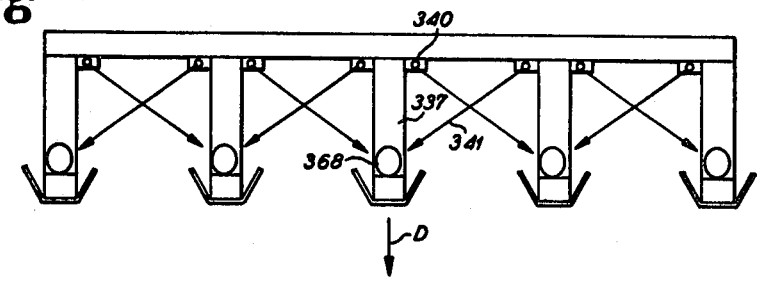
Figure 11:
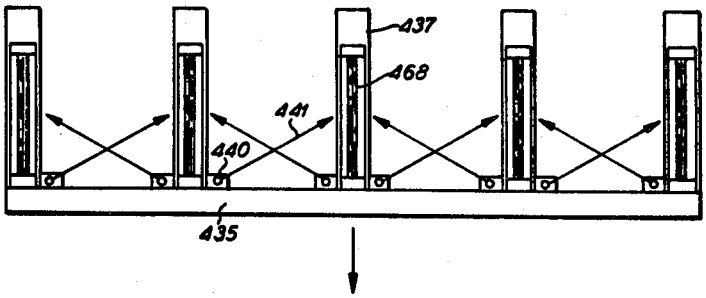

In the apparatus of FIG. 9, the spray nozzles 240 are mounted at the rear of the spray booms 137 and spray forwardly rather than rearwardly. In FIG. 10, the substantially flat mats have been replaced by mats 368 rounded and arranged about vertical axes, for receiving sprays 341 from the rear-mounted spray nozzles 340. Finally, in FIG. 11, the horizontal bar 435 is arranged at the front end of the spray apparatus, with spray nozzles 440 directing sprays 441 rearwardly *towards the mats 468*.

Each of the alternate embodiments is useful under different circumstances. Having the collection mats 68 arranged parallel to the direction of travel permits the sprayer to be used on greatly-inclined surfaces, where the sidewardly-mounted reservoirs of the first embodiment would not be useable. In each case, the transverse portion of the apparatus can be closed off, so that the wind shielding effects of the first embodiment can be preserved and enhanced.

Although various minor modifications may be suggested by those versed in the art, it should be understood that we wish to embody within the scope of the patent warranted hereon all such modifications as reasonably and properly come within the scope of our contribution to the art.

We claim as our invention:

1. A full-coverage recirculating sprayer assembly for application of herbicidal and other liquids via [solid] *spray* streams selectively to standing vegetation with recapture of liquid not contacting the vegetation, the sprayer assembly being carried on a vehicle for traversing an agricultural area in a direction; the assembly comprising a source of pressurized liquid carried on said vehicle, a horizontal bar carried on said vehicle and extending laterally of said direction; and a plurality of [solid-stream] *spray-stream* spray nozzles communicating to said source of pressurized liquid, a collector means placed to intercept said streams, and at least one reservoir located below said collector, all carried by said bar, and wherein:

the spray nozzles direct said streams at an angle to the direction of travel of at least 15°;

the spray nozzles are arranged in opposed pairs to provide [complete, criss-cross coverage to] *criss-cross spray patterns covering* all parts of the area traversed;

said collector means comprising *vertically disposed support means and collector mat means formed of* a [mat] *fibrous* material *and* having a vertical orientation *with a connection at the upper end with said support means* and a lower edge; [and]

said reservoir *being disposed* enclosing said lower edge of the collector mat and adapted to collect liquid flowing from the collector[, whereby to reduce wind and travel speed effects on the solid streams of liquid and splashing of said streams as they strike said weeds] *and said reservoir having an abutment surface projecting forwardly in the direction of travel of the vehicle to impact against vegetation and bend it over towards and into said spray patterns.*

2. A full-coverage recirculating sprayer assembly as defined in claim 1, wherein the sprayers direct said streams at up to about a 45° angle to the travel direction.

3. A full-coverage recirculating sprayer assembly as defined in claim 1, wherein the streams are directed rearwardly of the direction of travel of the vehicle.

4. A full-coverage recirculating sprayer assembly as defined in claim 1, wherein the streams are directed forwardly of the direction of travel of the vehicle.

5. A full-coverage recirculating sprayer assembly as defined in claim 1, wherein the collector means and reservoir extend laterally of the vehicle travel direction.

6. A full-coverage recirculating sprayer assembly as defined in claim 5, wherein the sprayer assembly is carried on a front part of the vehicle for first contact with vegetation as yet not passed over by said vehicle.

[7. A full-coverage recirculating sprayer assembly as defined in claim 6, wherein the reservoir is arranged below the height of the vegetation to be sprayed, thereby to contact said vegetation and bend at least some of them over and through at least one of said streams.]

8. A full-coverage recirculating sprayer assembly as defined in claim 5, wherein the reservoir is laterally segmented into compartments having no liquid communication therebetween.

9. A full-coverage recirculating sprayer assembly as defined in claim 1, wherein the collector means and the reservoir extend in the direction of travel of the vehicle.

10. A full-coverage recirculating sprayer assembly as defined in claim 1, wherein the collector means comprises a member rounded about a vertical axis and adapted and positioned to receive spray streams thereupon.

11. In a recirculating sprayer assembly for application of liquid to vegetation rising above the ground, the assembly adapted to be carried by a vehicle in a travel direction and comprising a plurality of spray nozzles each forming a solid stream of liquid, a collector means for intercepting the streams after passage among the weeds and a reservoir means for collecting unused liquid from the streams, the improvement comprising:

means for aligning the spray nozzles in opposed pairs to create criss-cross stream patterns, the patterns contacting one another across the width of the spray assembly normal to the travel direction to assure treatment of substantially all vegetation and the streams each having an angle of at least about 15° from the direction transverse to the vehicle travel direction, thereby to reduce wind and travel speed effects on the streams, the collector means comprises a fibrous matting material extending across the entire sprayer assembly width; and the storing means encloses a lower edge of the matting material and is located at a vertical height below the tops of vegetation to be sprayed.

12. In a recirculating agricultural sprayer assembly as defined in claim 11 the improvement thereof wherein the spray nozzles direct the streams rearwardly of a direction normal to the travel direction.

13. In a recirculating agricultural sprayer assembly for application of liquid to vegetation, the assembly adapted to be carried by a vehicle in a travel direction and comprising a plurality of spray nozzles each forming a [solid] *spray* stream of liquid, a collector means for intercepting the streams after passage among the vegetation and a reservoir means for collecting unused liquid from the streams, the improvement comprising:

means for aligning the spray nozzles in opposed pairs to create criss-cross stream patterns, the patterns contacting one another across the width of the spray assembly normal to the travel direction to assure treatment of substantially all vegetation, and the streams each having an angle of at least about 15° from the direction transverse to the vehicle travel direction, thereby to reduce wind and travel speed effects on the streams, the collector means comprise a plurality of fibrous mats [in which liquid gravitates by capillarity flow and] arranged parallel to the travel direction of the vehicle to form vertically upright absorptive collective surfaces, at least one spray stream of each adjacent pair of nozzles contacting opposite sides of each mat, *and* the reservoir means [encloses] *having a slotted opening receiving and closely confining* a lower edge of the matting material *to seal out foreign particles from said reservoir means* and is located at a vertical height below the tops of vegetation to be sprayed.

14. In a recirculating agricultural sprayer assembly as defined in claim 13, the improvement thereof wherein the spray nozzles direct the streams rearwardly of a direction normal to the travel direction.

15. In a recirculating agricultural sprayer assembly as defined in claim 13, the improvement thereof wherein the spray nozzles direct the streams forwardly of a direction normal to the travel direction.

16. A recirculating sprayer for treating vegetation adapted for use with a tractor comprising, means including a mat of fibrous material [in which liquid gravitates by capillarity flow and] disposed to form an upright [absorbent] collector and filter surface, spray means spaced from said mat and arranged to direct a spray of treatment liquid towards said [absorbent] surface for impact therewith, means for guiding vegetation to be treated through the spray as the sprayer is advanced so that spray not impacted against the vegetation will be recovered by impacting against said [absorbent] collector and filter surface with minimal splashing [and will gravitate by capillarity flow in the fibrous mat towards a lower edge of said mat], a reservoir *subjacent said mat and having a slotted opening receiving and closely confining* the lower edge of said mat *to seal out foreign particles from said reservoir means* into which the recovered and filtered liquid is discharged by the mat for collection [in the reservoir], and means to exhaust the recovered liquid from said reservoir for recirculation to said spray means.

17. A recirculating sprayer as defined in claim 16 wherein there are a plurality of mats and a plurality of reservoirs.

18. A recirculating sprayer as defined in claim 17 where each of said plurality of mats and each said plurality of reservoirs are disposed in the direction of travel and are arranged in spaced parallel planes.

19. A recirculating sprayer as defined in claim 17 where each of said plurality of mats and each of said plurality of reservoirs are disposed transversely of the direction of travel in substantially coplanar relationship with one another.

[20. A tractor-propelled spray mechanism for treating vegetation comprising, means forming a recirculating liquid circuit through which a treatment liquid is directed, a pump at one point in said circuit for pressurizing a supply of liquid and for directing the liquid in the circuit in the form of a pressurized stream, a spray means at a second point in said circuit downstream of said first point for projecting the pressurized stream in the form of a directionalized spray pattern to form a treatment zone through which vegetation under treatment may be guided, collector means including a fibrous mat in which liquid gravitates by capillarity flow and disposed to form a vertically upright absorptive collector surface spaced oppositely from said spray means on the other side of said treatment zone to recover the excess liquid not impacted against the vegetation, said fibrous mat having a lower edge to which the liquid flows for discharge, a reservoir means receiving and confining said lower edge of said fibrous mat and into which recovered liquid is discharged by said lower edge, and means for recirculating the recovered liquid from said reservoir means to the pump.]

21. [A recirculating sprayer as defined in claim 16,] *A recirculating sprayer for treating vegetation adapted for use with a tractor comprising:*

*means including a mat of fibrous material disposed to form an upright collector and filter surface,*

*spray means spaced from said mat and arranged to direct a spray of treatment liquid towards said surface for impact therewith,*

*means for guiding vegetation to be treated through the spray as the sprayer is advanced so that spray not impacted against the vegetation will be recovered by impacting against said collector and filter surface with minimal splashing,*

*a reservoir subjacent said mat and having a slotted opening receiving and closely confining the lower edge of said mat to seal out foreign particles from said reservoir means into which the recovered and filtered liquid is discharged by the mat for collection,* said reservoir extending transversely of the direction of travel and being disposed at a level to bend vegetation downwardly and forwardly towards the spray means as the sprayer is advanced, said spray means being disposed to spray liquid streams at a level higher than said reservoir and forwardly of said reservoir to direct a spray stream rearwardly directly into the bent-over vegetation[.], *and means to exhaust the recovered liquid from said reservoir for recirculation to said spray means.*

22. A recirculating sprayer as defined in claim 21 and further characterized by said reservoir comprising a tubular component slotted to receive the edge of the mat and forming a rounded abutment surface for engaging vegetation extending above the level of the reservoir.

23. The method of liquid spraying with a recirculating spray liquid for treating vegetation which includes the steps of directing a treatment *liquid* through a closed circuit, at one point in the circuit pressurizing the liquid to drive the liquid in the form of a stream, at a second point in the circuit throttling the pressurized stream to form [a directionalized] *criss-cross* spray [pattern] *patterns* through which vegetation under treatment may be guided, at a third point in the circuit [absorptively] intercepting the [directionalized] *criss-cross* spray [pattern] *patterns* with a *substantially continuous* fibrous collector surface to recover and filter the excess liquid not impacted against the vegetation,

[gravitationally and by capillarity flow] directing the intercepted and recovered clarified liquid at said surface towards a reservoir receiving the lower edge of said fibrous collector surface at a fourth point in the circuit,

*screening the spray patterns from wind effects by spanning the entire width of said criss-cross spray patterns with said fibrous collector surface,* and recirculating the collected filtered liquid from the reservoir back to said one point in the circuit.

*24. A full-coverage recirculating sprayer assembly as defined in claim 1, wherein each said opposed pair of spray nozzles are disposed to direct their streams in patterns contacting one another before being intercepted by said collector means.*

*25. A full-coverage recirculating sprayer assembly as defined in claim 1, wherein the reservoir has a slotted opening receiving and closely confining said lower edge of the collector mat to seal out foreign particles from said reservoir.*

*26. A recirculating sprayer assembly as defined in claim 16, wherein said means including said mat is disposed to reduce wind effects on the spray of treatment liquid.*

*27. A recirculating sprayer as defined in claim 16, wherein said reservoir includes an abutment surface spaced forwardly of said mat to impact against vegetation.*

*28. In a recirculating sprayer assembly for application of herbicidal and other liquid to vegetation rising above the ground, the assembly adapted to be carried by a vehicle in a travel direction and comprising a source of pressurized liquid carried on said vehicle, a plurality of spray nozzles each forming a stream of liquid and communicating with said source of pressurized liquid, a collector means for intercepting unused liquid of said streams, and a reservoir means receiving a lower portion of said collector means for collecting intercepted unused liquid, the improvement comprising:*

*means for arranging said spray nozzles so as to direct said streams at an angle to the travel direction of at least 15° and in opposed pairs to provide intersecting criss-cross spray patterns in areas traversed by said assembly and*

*said reservoir means having an abutment surface substantially spanning said assembly in a direction transverse to said travel direction for impacting against said vegetation and bending it over towards said spray patterns.*

*29. In a recirculating sprayer assembly as defined in claim 28, the improvement, wherein said collector means comprises a substantially continuous fibrous matting material extending across the transverse width of said assembly and said reservoir means comprises a tubular member disposed beneath said matting having an opening means for receiving a lower edge thereof.*

*30. In a recirculating sprayer assembly as defined in claim 29, the improvement, wherein said collector means further comprises a vertically disposed support means behind said matting and connected with an upper end of said matting.*

*31. In a recirculating sprayer assembly as defined in claim 28, the improvement, wherein said collector means comprises a plurality of fibrous mats disposed parallel to said travel direction and spaced apart from one another by said spray patterns.*

*32. In a recirculating sprayer assembly as defined in claim 31, the improvement, wherein said spray nozzles are positioned spaced apart from said abutment surface in said travel direction with said spray patterns being between said abutment surface and said spray nozzles.*

*33. In a recirculating sprayer assembly as defined in claim 28, the improvement, wherein said spray nozzles are positioned spaced apart from said abutment surface in said travel direction with said spray patterns being between said abutment surface and said spray nozzles.*

* * * * *